(12) United States Patent
de Grasse et al.

(10) Patent No.: US 10,915,077 B2
(45) Date of Patent: Feb. 9, 2021

(54) SYSTEMS AND METHODS FOR CONTROLLING AN INFLATABLE DEVICE

(71) Applicant: Aqua-Leisure Industries, Inc., Avon, MA (US)

(72) Inventors: Scott R. de Grasse, Marshfield, MA (US); Gregory J. Autore, Spring Valley, OH (US); Jesse Kane, Attleboro, MA (US)

(73) Assignee: Aqua-Leisure Industries, Inc., Avon, MA (US)

( * ) Notice: Subject to any disclaimer, the term of this patent is extended or adjusted under 35 U.S.C. 154(b) by 17 days.

(21) Appl. No.: 15/979,811

(22) Filed: May 15, 2018

(65) Prior Publication Data
US 2018/0335760 A1 Nov. 22, 2018

Related U.S. Application Data

(60) Provisional application No. 62/507,029, filed on May 16, 2017.

(51) Int. Cl.
| | |
|---|---|
| *G05B 15/02* | (2006.01) |
| *H04R 1/02* | (2006.01) |
| *H05B 45/20* | (2020.01) |
| *H05B 47/12* | (2020.01) |
| *H05B 47/19* | (2020.01) |

(52) U.S. Cl.
CPC ............ *G05B 15/02* (2013.01); *H04R 1/028* (2013.01); *H05B 45/20* (2020.01); *H05B 47/12* (2020.01); *H05B 47/19* (2020.01)

(58) Field of Classification Search
CPC .... G05B 15/02; G05B 15/0421; G05B 15/04; H04R 1/028; H05B 37/0236; H05B 33/0857; H05B 37/0272; A47C 21/003; A47C 21/04; A47C 27/081; A61G 7/015
See application file for complete search history.

(56) References Cited

U.S. PATENT DOCUMENTS

| | | | | |
|---|---|---|---|---|
| 2002/0154787 A1* | 10/2002 | Rice | ...................... | H04R 29/008 381/124 |
| 2004/0116039 A1* | 6/2004 | Mueller | .................. | A63H 27/10 446/220 |
| 2006/0107573 A1* | 5/2006 | Machala | .................. | G09F 15/00 40/610 |

(Continued)

*Primary Examiner* — Chun Cao
(74) *Attorney, Agent, or Firm* — Wolf, Greenfield & Sacks, P.C.

(57) ABSTRACT

An inflatable device including an inflatable body, at least one processor and communication circuit, at least one fan connected to the at least one processor, at least one lighting component connected to the at least one processor, and at least one speaker connected to the at least one processor. The at least one processor may be configured to control operation of the at least one fan to manage the inflation of the inflatable body, control operation of the at least one lighting component, and control operation of the at least one speaker. The processor may be further configured to execute operational control responsive to signals from an application installed on a mobile device. The inflatable device may be configured to play audio from the mobile device over the at least one speaker and match light patterns of the at least one lighting component to the audio.

19 Claims, 13 Drawing Sheets

(56) References Cited

U.S. PATENT DOCUMENTS

| | | | |
|---|---|---|---|
| 2006/0230655 A1* | 10/2006 | Machala | G09F 19/00 |
| | | | 40/410 |
| 2008/0175006 A1* | 7/2008 | Kellmann | F21V 3/023 |
| | | | 362/360 |
| 2014/0259418 A1* | 9/2014 | Nunn | A47C 21/003 |
| | | | 5/617 |
| 2015/0157137 A1* | 6/2015 | Nunn | G05B 23/0267 |
| | | | 5/706 |
| 2015/0182033 A1* | 7/2015 | Brosnan | A47C 27/082 |
| | | | 5/706 |
| 2016/0120008 A1* | 4/2016 | Sutherland | H05B 45/00 |
| | | | 340/815.46 |
| 2017/0187154 A1* | 6/2017 | Skelton | H05B 47/19 |
| 2018/0063613 A1* | 3/2018 | Cohen | H04R 1/028 |
| 2018/0320834 A1* | 11/2018 | Maguire | F21L 4/08 |

\* cited by examiner

SYSTEMS AND METHODS FOR CONTROLLING AN INFLATABLE DEVICE

RELATED APPLICATIONS

This application claims priority under 35 U.S.C. § 119(e) to U.S. Provisional Application Ser. No. 62/507,029 entitled "SYSTEMS AND METHODS FOR CONTROLLING AN INFLATABLE DEVICE," filed on May 16, 2017, which is incorporated herein by reference in its entirety.

BACKGROUND

Various inflatable commercial devices are available. The capabilities of a conventional inflatable are limited.

SUMMARY

According to one aspect, a fully integrated inflatable and application based control is provided. According to some embodiments, the fully integrated inflatable and application based control include a wireless (e.g., a Bluetooth) communication module, a mobile device (e.g., smart phone, mobile computer, tablet, etc.) with corresponding communication module, an application on the mobile device for controlling any and/or all functionality associated with the air-form, and the inflatable device under control.

According to some embodiments, the inflatable device includes inflation fans, optionally fans for causing or controlling movement, internal and/or external lighting, motors, speakers, etc. In one embodiment, the mobile device includes an application configured to control various components of the inflatable device. In one example, the application provides a user interface that facilitates execution of the respective functionality of the components. For example, the application can control inflation and deflation of the inflatable device. Other options in the user interface can enable remote control of lighting, motion, sounds, and pass through of audio captured or recorded at the mobile device. In other embodiments, the application is configured to store user settings, lighting cues, audio files, etc. and enable time based triggering of any one or more or any combination of the forgoing at chosen, preset, and/or random times.

According to one aspect, an inflatable device is provided. The inflatable device comprises an inflatable body, at least one processor and communication circuit, at least one fan connected to the at least one processor, at least one lighting component connected to the at least one processor, at least one speaker connected to the at least one processor, wherein the at least one processor is configured to control operation of the at least one fan to manage inflation of the inflatable body, control operation of the at least one lighting component, and control operation of the at least one speaker, wherein the at least one processor is further configured to execute operational control responsive to signals from an application installed on a mobile device.

According to another aspect, there is provided a method for controlling an inflatable device. The method comprises controlling an inflatable device comprising an inflatable body, based at least in part on signals from an application installed on a mobile device, by at least one processor. The controlling comprises managing inflation of the inflatable body by at least one fan connected to the at least one processor, controlling operation of at least one lighting component connected to the at least one processor, and controlling operation of at least one speaker connected to the at least one processor.

According to one embodiment, the at least one processor is embedded on a motherboard. According to one embodiment, the at least one processor comprises an integrated circuit. According to one embodiment, the at least one processor is configured to receive audio captured by a microphone on the mobile device and play the captured audio over the at least one speaker. According to one embodiment, the communication circuit comprises at least one of a Bluetooth communication component, a wireless network interface circuit, or a cellular communication circuit.

Still other aspects, embodiments, and advantages of these exemplary aspects and embodiments, are discussed in detail below. Any embodiment disclosed herein may be combined with any other embodiment in any manner consistent with at least one of the objects, aims and needs disclosed herein, and references to "an embodiment," "some embodiments," "an alternate embodiment," "various embodiments," "one embodiment" or the like are not necessarily mutually exclusive and are intended to indicate that a particular feature, structure or characteristic described in connection with the embodiment may be included in at least one embodiment. The appearances of such terms herein are not necessarily all referring to the same embodiment. The accompanying drawings are included to provide illustration and a further understanding of the various aspects and embodiments, and are incorporated and constitute a part of this specification. The drawings, together with the remainder of the specification, serve to explain principles and operations of the described and claimed aspects and embodiments.

DETAILED DESCRIPTION

Figure 1:
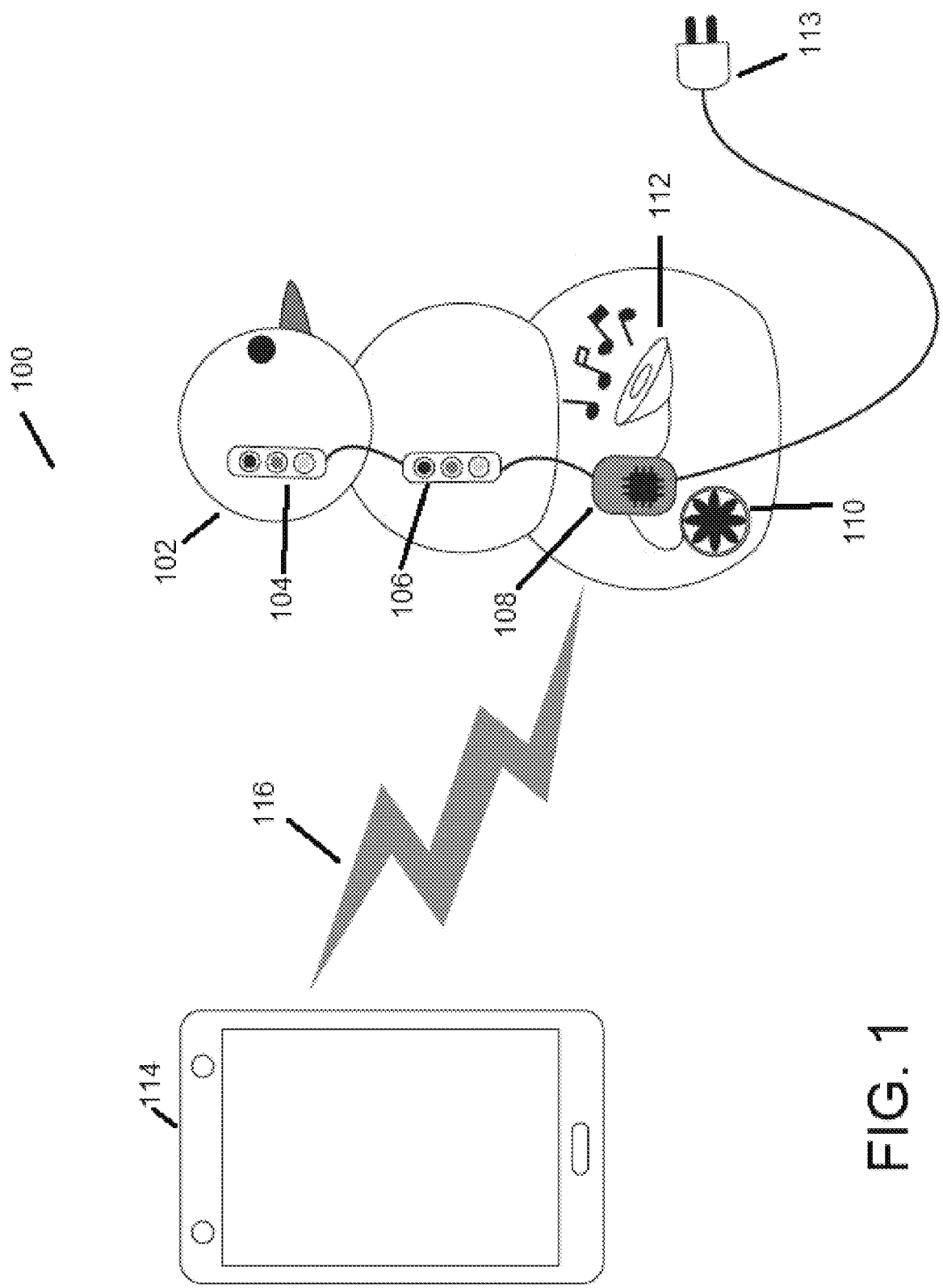
FIG. 1 shows a block diagram of an inflatable and mobile device controller, according to one embodiment.

Stated broadly, various aspects herein describe inflatable devices and controllers for device functionality. According to one embodiment, an inflatable device can be configured to receive control signals from a mobile device, where operation of various components of the inflatable (e.g., power, motors, fans, lights, speakers, etc.) is dependent on or managed by the mobile device. Some embodiments can also include local processing and control that can be overridden by the mobile device control signals.

In further embodiments, user interfaces displayed on the mobile device allow the end user to schedule functionality (e.g., inflate at time, deflate after time or time period, etc.) of the inflatable device. The functionality controlled by the mobile device can extend to visual displays (e.g., trigger lighting effect, lighting cues, lighting sequences) as well as audio displays (e.g., play song, trigger pre-recorded audio, play different songs or audio and specified times, etc.). In some examples, the mobile device is configured to pass live audio for broadcast at the inflatable device.

The disclosure provided herein is not limited in its application to the details of construction and the arrangement of components set forth in the following description or illustrated in the drawings. The disclosure is capable of other embodiments and of being practiced or of being carried out in various ways. Also, the phraseology and terminology used herein is for the purpose of description and should not be regarded as limiting. The use of "including," "comprising," "having," "containing," "involving," and variations thereof herein is meant to encompass the items listed thereafter and equivalents thereof as well as additional items.

FIG. 1 shows a block diagram 100 of signal flow between an inflatable 102, inflatable components (104-112), and a mobile device controller 114. According to one embodiment, the mobile device controller 114 communicates a control signal 116 to a motherboard 108 of the inflatable device 102. In some examples, the motherboard 108 can include a wireless communication circuit or Bluetooth receiver. The motherboard 108 can limit control functions to mobile devices that have been paired with the inflatable, for example, through a registration process where the mobile device and/or application on the mobile device authenticates to the motherboard 108. Authentication information can then be stored and used to identify registered or paired devices or applications.

In one example, the motherboard is configured to receive a signal from the device/application and identify the control signal as an instruction to inflate the inflatable device 102. Typically inflatable device 102 is constructed and arranged so that the inflatable device holds its shape under pressure delivered by an air intake fan (e.g., 110). Power supply 113 can be connected to any household supply and include circuitry to delivery appropriate power to the motherboard 108 and/or components connected (e.g., 110) to motherboard (e.g., 108). In addition to control signals (e.g., 116) for the fan or fan motor, the mobile device/application can communicate control signals for other components, including speakers 112, and lights 106 and 104. Each of the components can be controlled separately by the mobile device or can be triggered together. In one example, control sequences can be triggered from the mobile device such a communication of the control signal turns on the fan 110, broadcasts audio from the speaker(s) 112, and turns on the lights 104-106, which can include activating light patterns and/or displays.

In further examples, the light patterns can be matched to any audio being played over the speakers, including custom audio files or audio passed through the mobile device.

Figure 2:
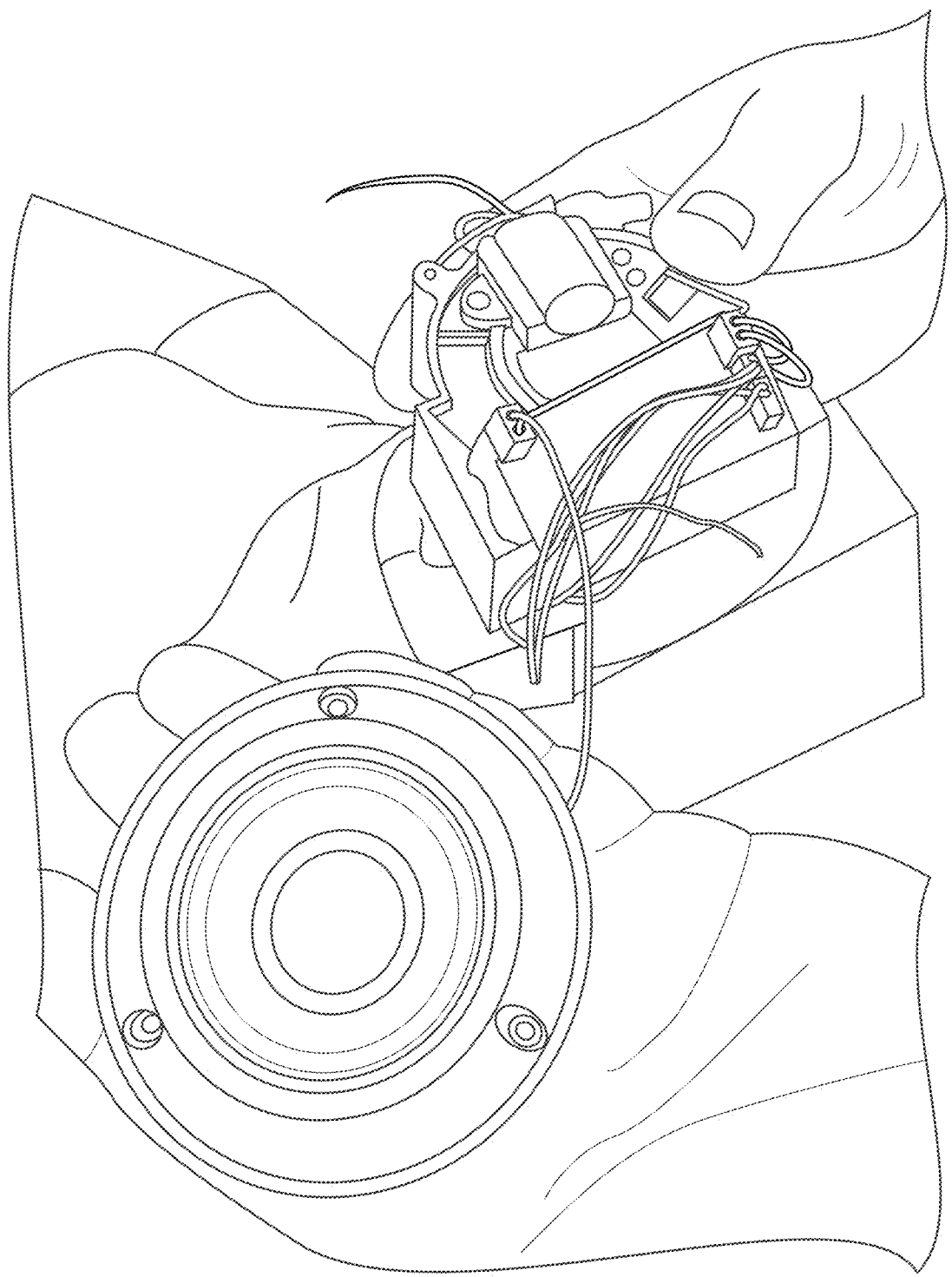
FIG. 2 shows example component of an integrate inflatable device, according to one embodiment.

FIG. 2 illustrates an example motherboard, Bluetooth communication circuit, and speaker.

Figure 3:
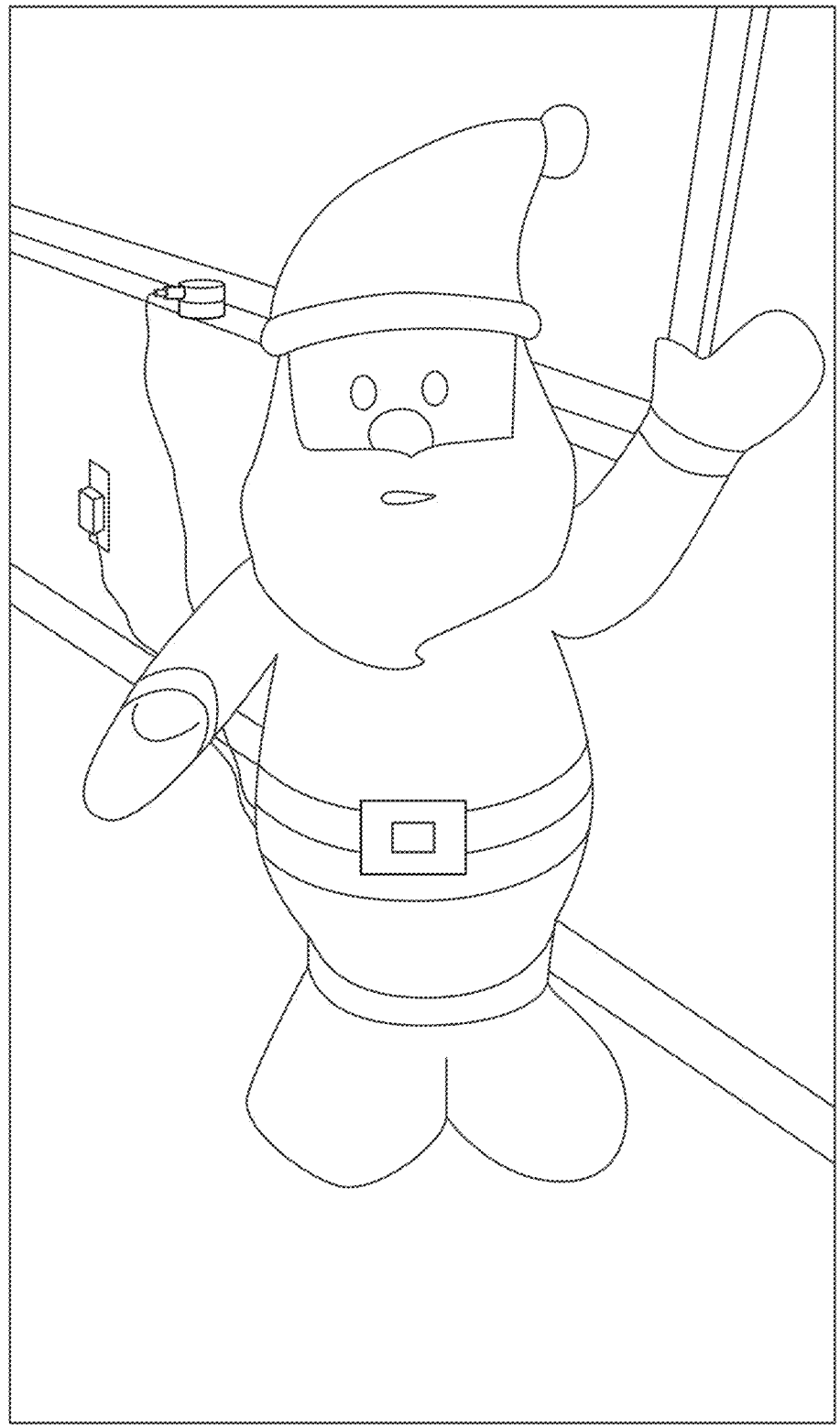
FIG. 3 shows an example constant air inflatable device, according to one embodiment.

According to other embodiments, the mobile controller/mobile application can be configured to control multiple inflatable devices (e.g., singly or in combination). FIG. 3 illustrates another example of an inflatable device with fully integrated component control. The inflatable device shown is a constant air inflatable device, such that the fan or motor is in operation when the device is in the configuration shown. Once the fan or motor is turned off, the constant air inflatable deflates. In further examples, the fan can be bi-direction so that the mobile device can actively deflate a constant air inflatable. The motherboard, mobile device, and/or mobile application can be configured to limit operation of the fan or motor to exhaust air to a short period of time (e.g., seconds) to avoid stressing the fan or motor or damaging the constant air inflatable.

In other embodiments, the inflatable air component can be integrated into other constant air inflatable devices (FIG. 3) or into other inflatable devices that do not require constant air. Some example devices include constant air large scale items, constant air items that change size/shape due to programed inflation patterns, pool lounge, pool float, beach ball/beach cube, inflatable sprinkler, water slide, among other options.

In addition to controlling inflation and/or deflation via the mobile device, various embodiments of an inflatable device can incorporate more than one fan, for example, to enable motion of the inflatable device. Example of motion control can include variable inflation of appendages of an inflatable device, variable inflation of the inflatable device (e.g., triggering expansion and contraction of a body of the inflatable device) and/or propulsion of an inflatable device via an exhaust. Some examples include pre-programmed inflation/deflation sequences to provide corresponding sequences of motion by the inflatable device.

Figure 5:
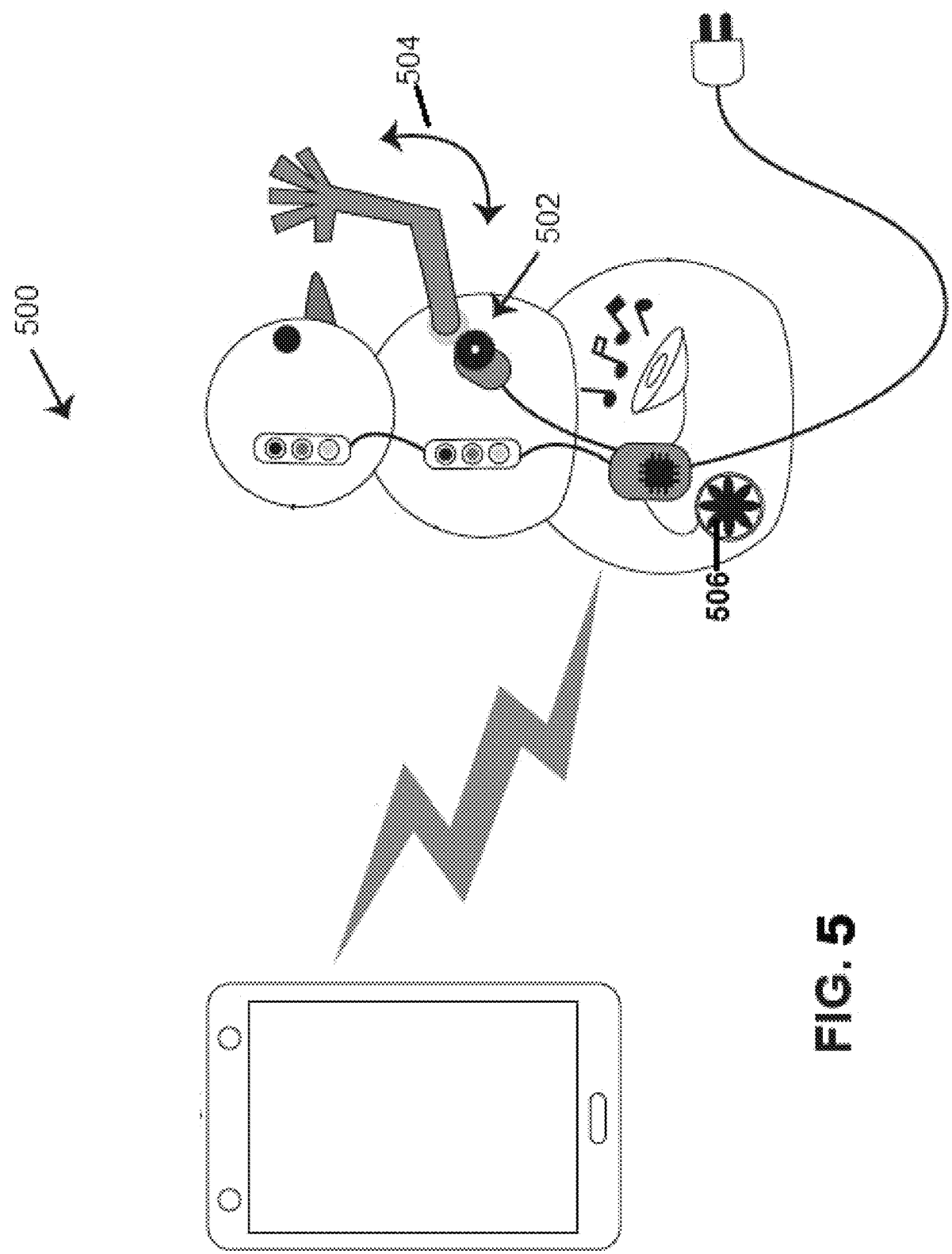
FIG. 5 shows a block diagram of an inflatable and mobile device controller, according to one embodiment.

FIG. 5 shows a block diagram 500 of an inflatable and mobile device controller having multiple fans (e.g., 502 and 506). Fan 502 is triggered to cause a portion of the inflatable to move, for example, along path 504, as the fan is activated and/deactivated.

According to another aspect, the mobile device controller can be used to manage other motors beyond fans. In some embodiments, a water diverter can be controlled via the mobile device or mobile application. In one example, the mobile device can control an inflatable water slide and associated water supply for the slide. The end user may program the mobile application to start water flow and/or inflation of the slide at a designated time. In such embodiments, the slide or other inflatable can include an attachment for connecting a hose or other water supply.

Example Mobile Device Application/External Controller

According to some embodiments, an application installed on the mobile device is configured as the primary control for the inflatable device (e.g., via communication with a Bluetooth module on the device). In some instances, an end user can download and install the application from an App Store or from a website provided by the distributor or manufacturer. Once installed the application is programmed to guide the end user through controller and device pairing/authentication. According to some embodiments, the motherboard is configured to require authentication/pairing before responding to commands.

In some embodiments, the application provides a number of user interface screens for end users to access and control inflatable functionality. In some example, the user interface screens are simplified for ease of use and intuitive control of inflatable functionality.

Figure 4A:
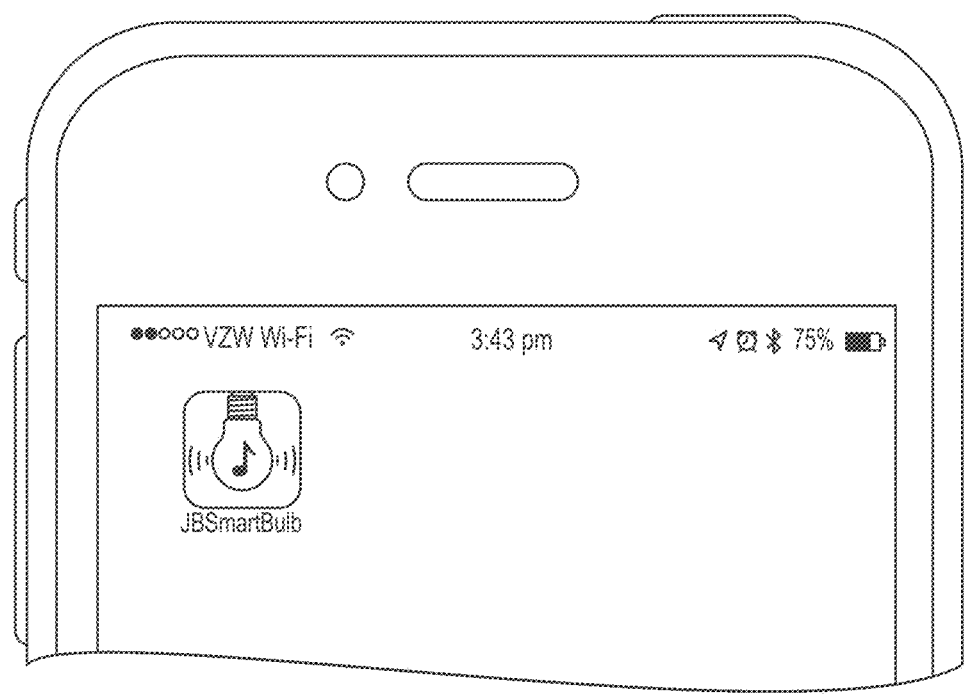
FIGS. 4A-I shows example screens of a user interface according to one embodiment.
Figure 4B:
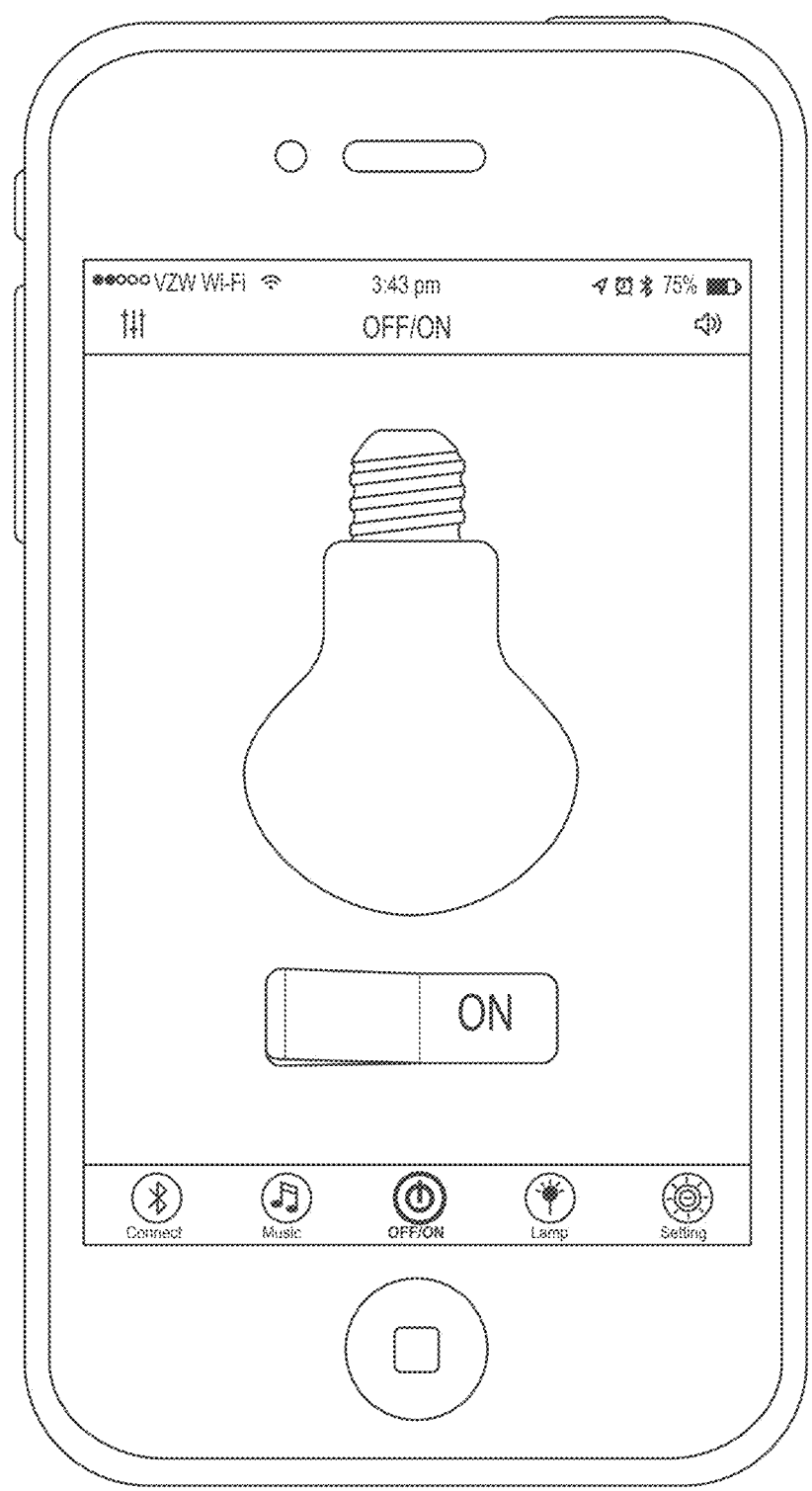

FIG. 4A illustrates an example icon that can be displayed on a mobile device for access the application and associated control functions. FIG. 4B illustrates an example screen for controlling light functions. In this example the screen provides a simple light switch display to turn the lighting functions on or off. In some embodiments, this can trigger pre-programmed lighting sequences or cues. The motherboard can also be configured to select what light function is activated by the switch depending on a current context of the inflatable device (e.g., if music is playing sync, light sequence with music; if no music, randomly select pre-programmed light sequences, among other options).

Figure 4C:
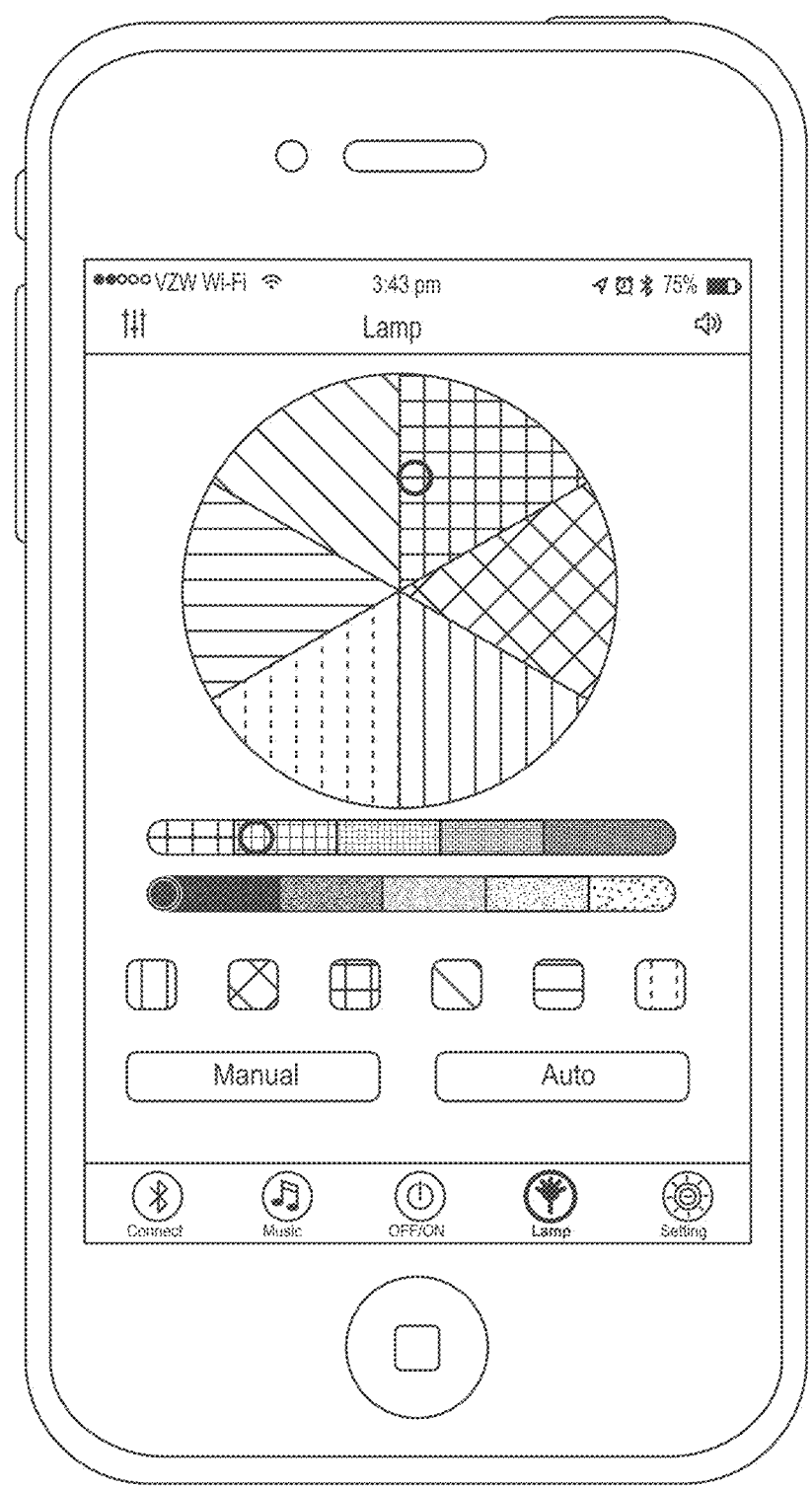

FIG. 4C is an example color control screen configured to accept user input on display color for any light components for the inflatable device. In further examples (not shown), the user interface can include additional screens for multiple lighting components and enable individual control of color setting for each component.

Figure 4D:

FIG. 4D is an example screen of an embodiment of the user interface. The screen is configured to display any detected inflatable devices. If a device selected in the screen is not paired with the application or device, the application is configured to guide the user through pairing the application/mobile device with the detected inflatable. In some embodiments, the inflatable is configured to communicate identifying information on the inflatable (e.g., name), which can include information on available functions. The information on available functions can be used by the application to tailor the user interface and/or associated screens to the available functions of the inflatable.

Figure 4E:
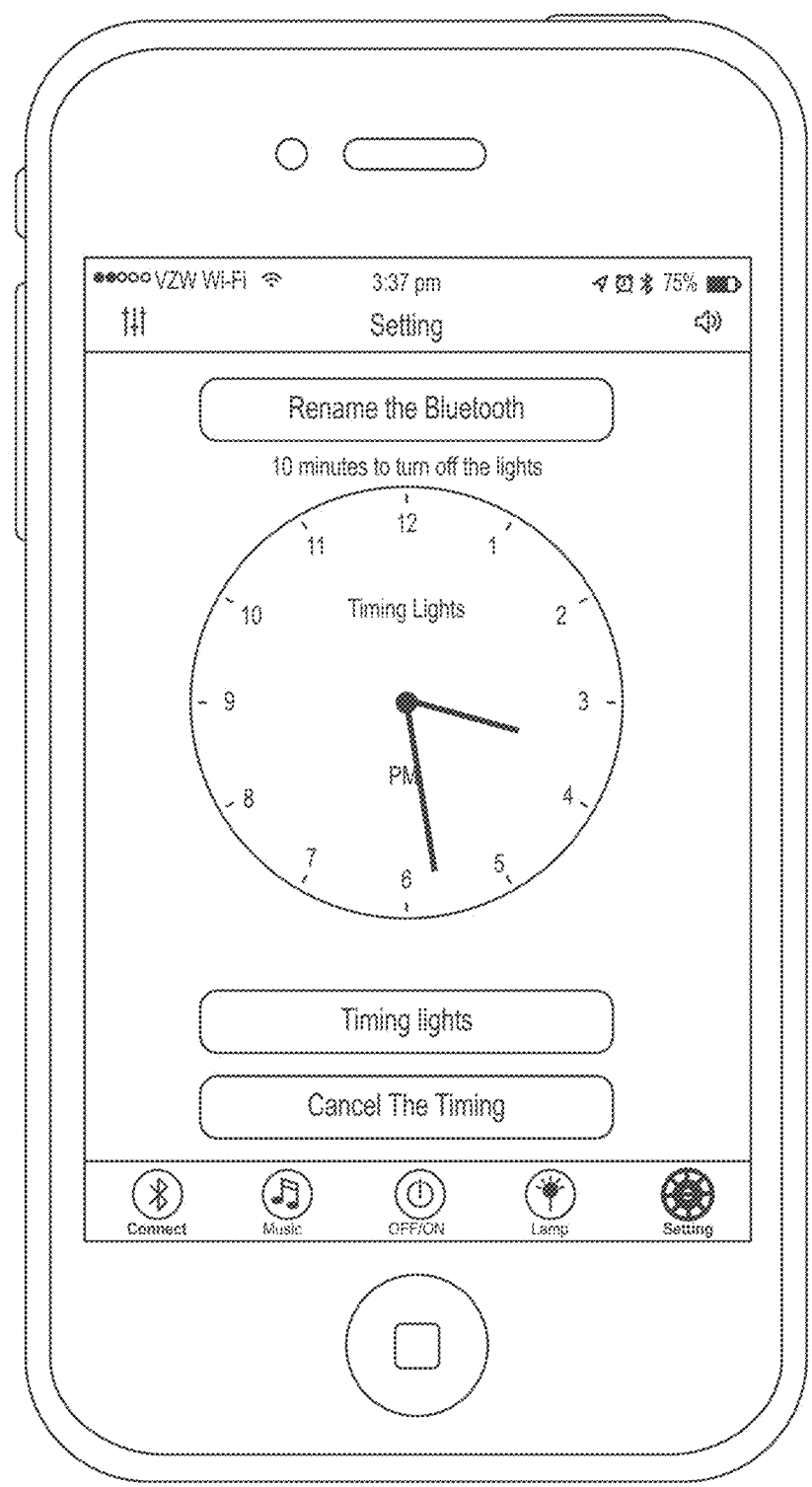
Figure 4F:
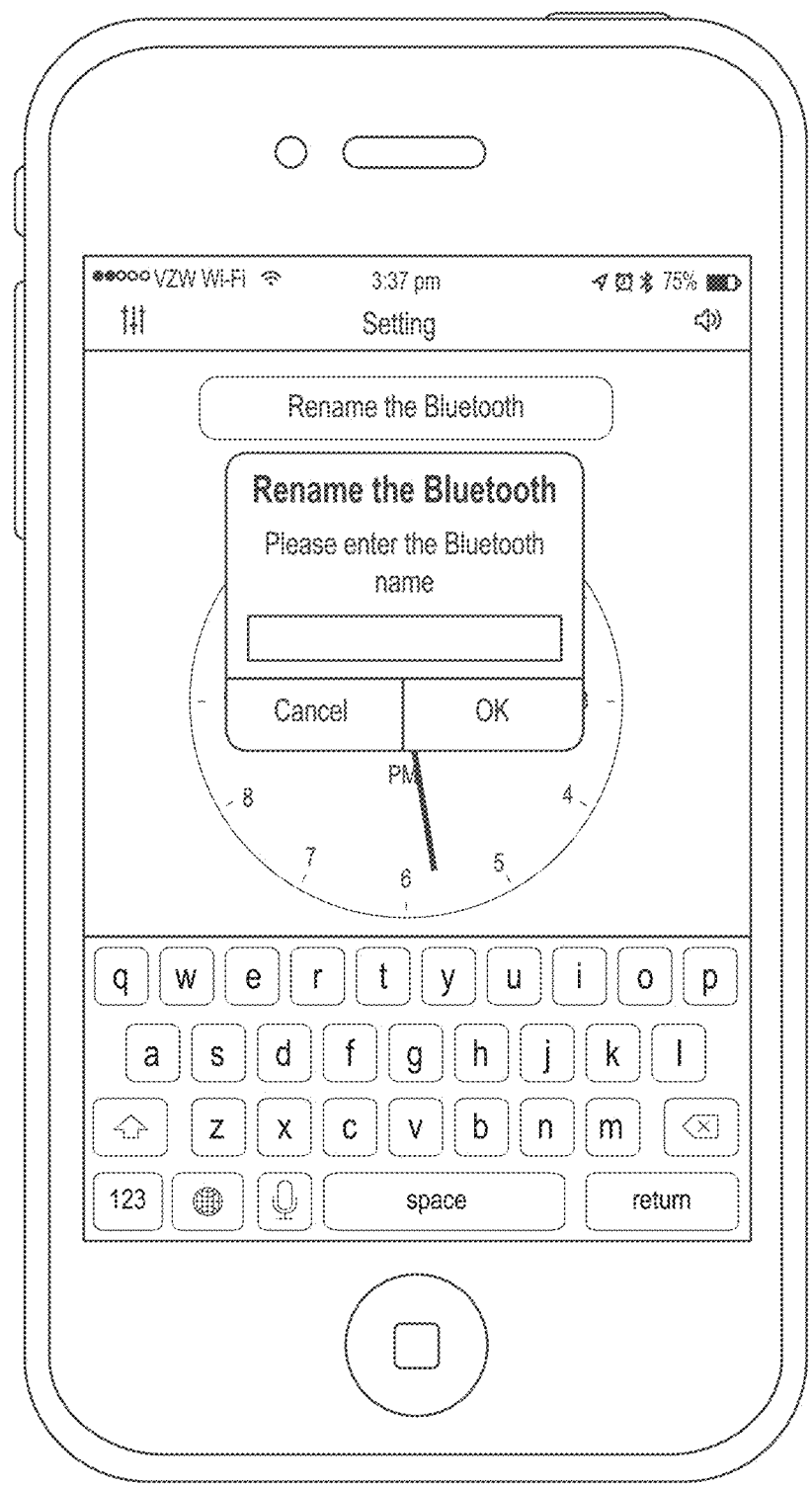

FIG. 4E is an example screen of a timing function for the lighting components of the inflatable device. FIG. 4F is an example screen for customizing information associated with the inflatable device. In this example, the end user can specify a name for a paired inflatable device. The user can customize other options for the device in other screens (not shown).

Figure 4G:
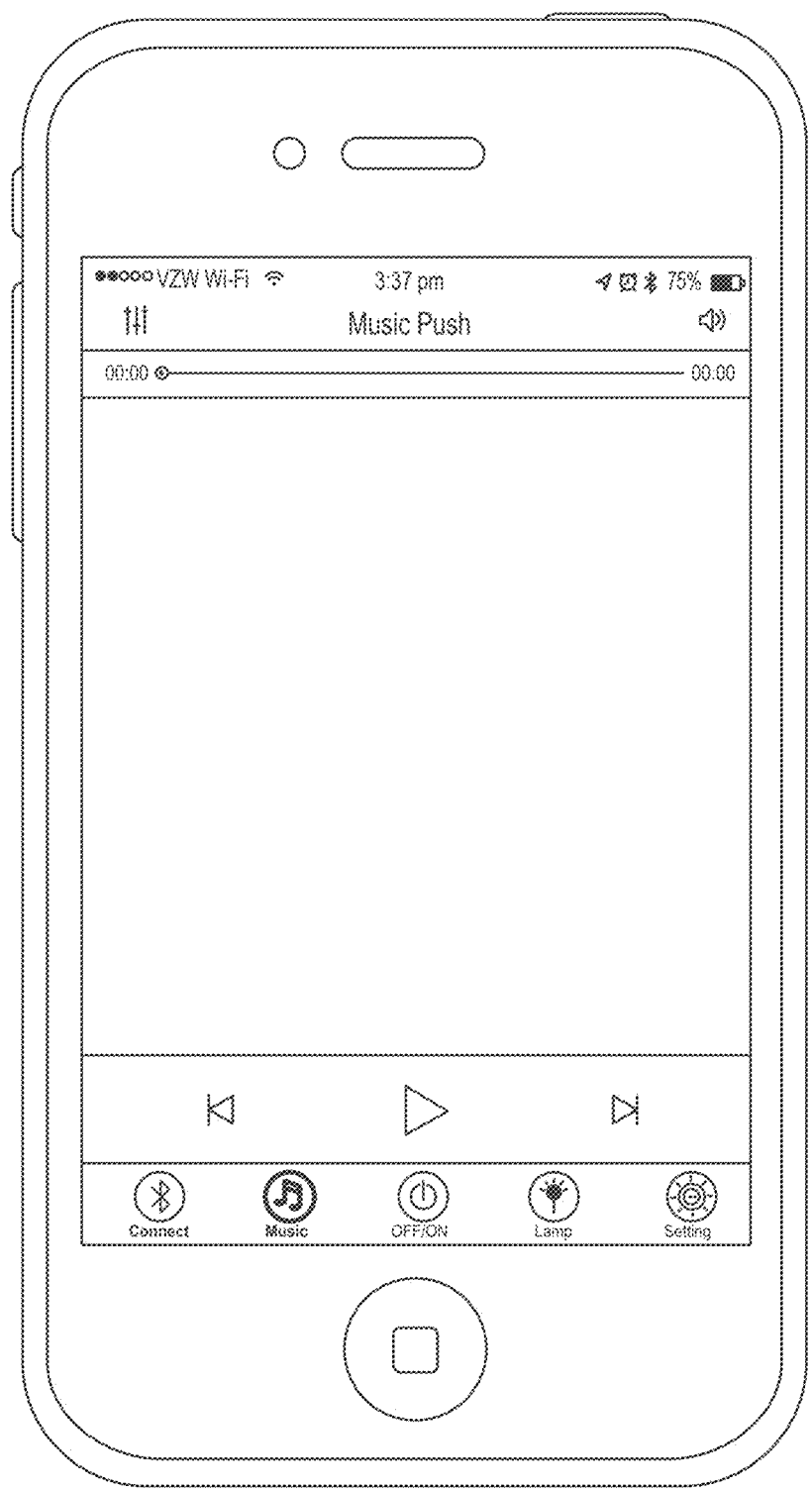

FIG. 4G is an example screen for controlling music functionality. According to one embodiment, the user can access the music control (e.g., via selection in the menu bar at the bottom of the screen) to push available music to the inflatable device and trigger playing of songs through speaker components on the inflatable. In other embodiments, the user can also control live transmission of sound captured by a mobile device microphone and broadcast their own voice through the speaker components on the inflatable device.

Figure 4H:
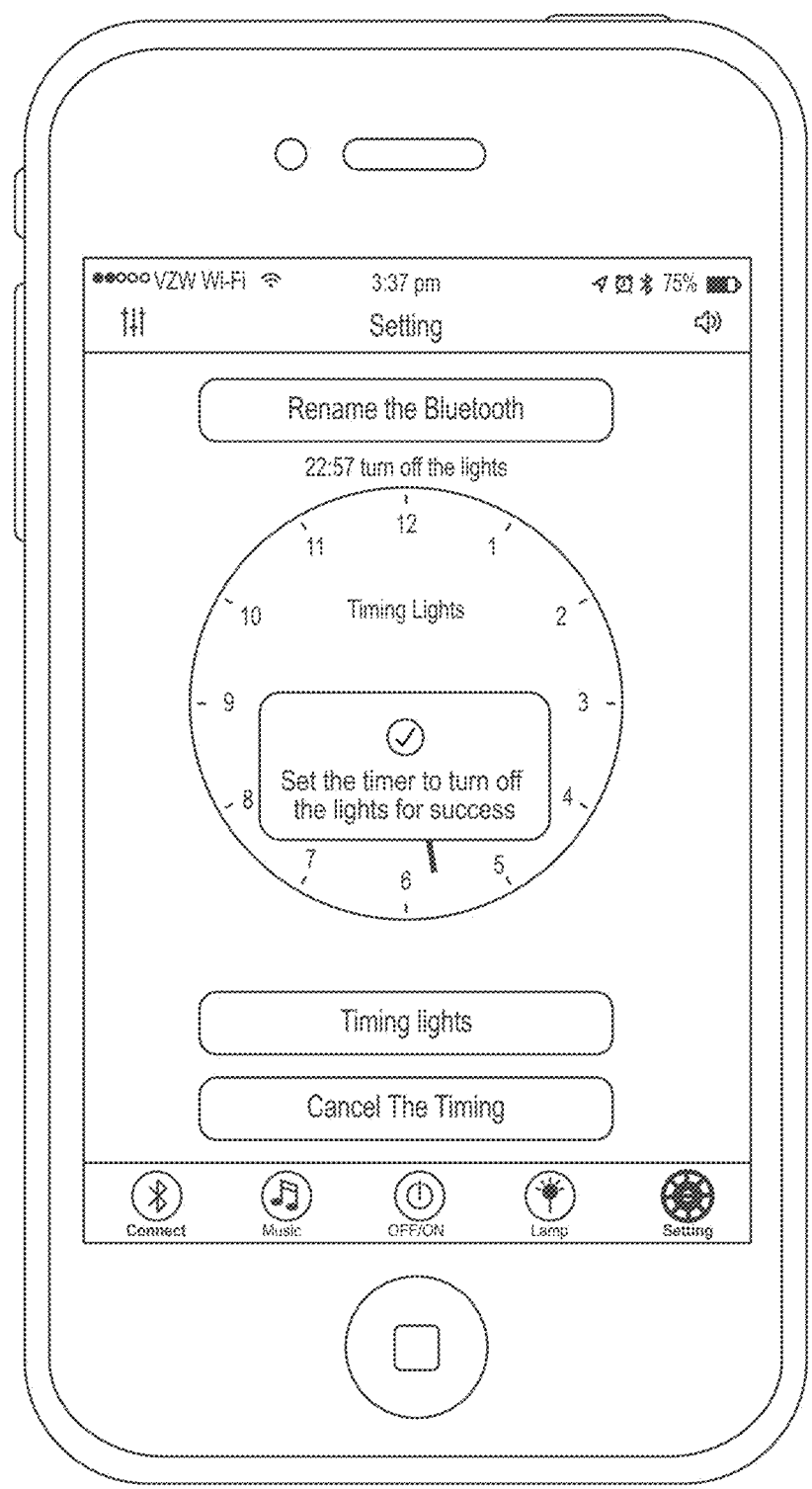
Figure 4I:
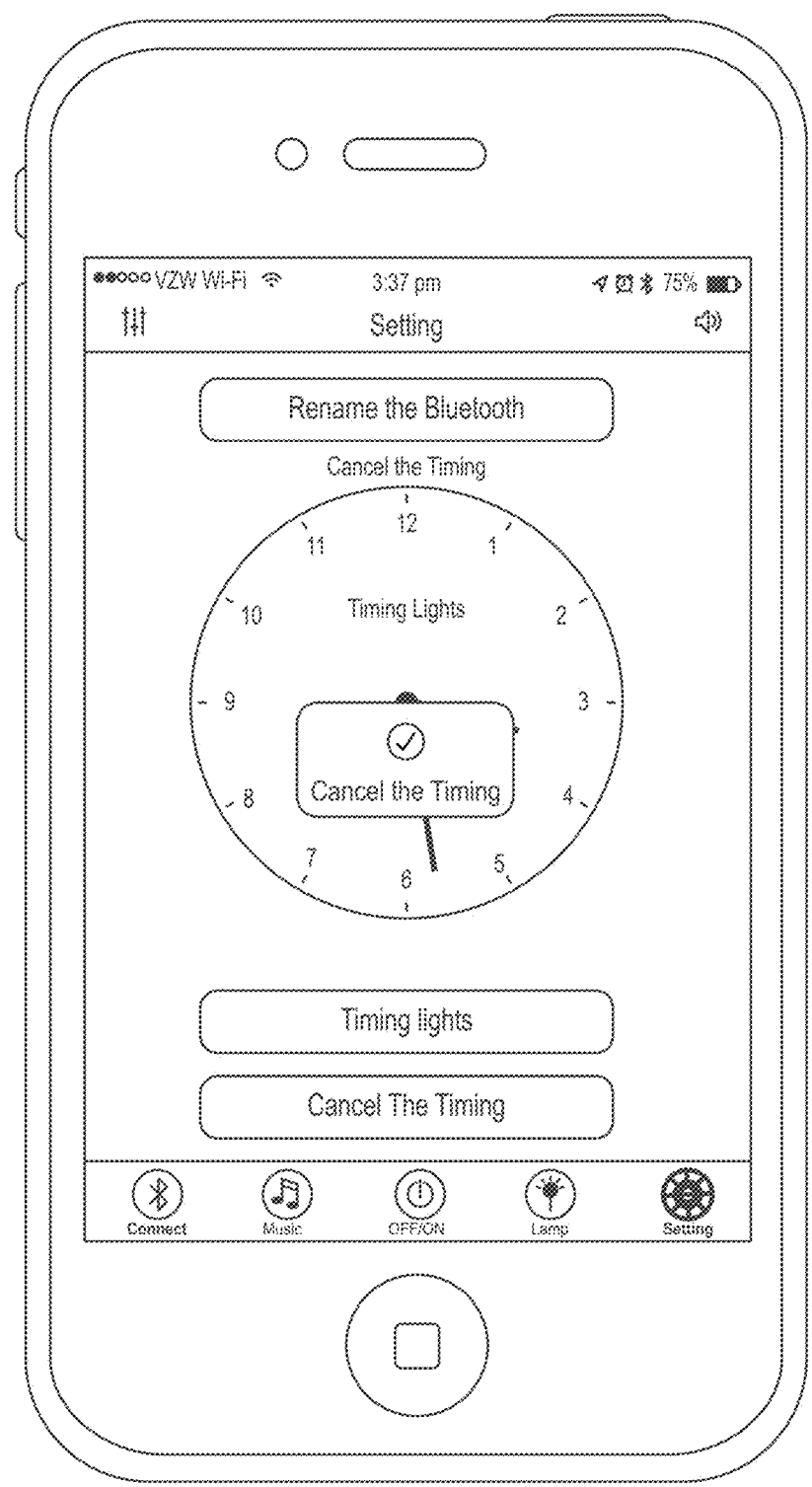

FIGS. 4H and 4I illustrate further example screens of the user interface. The screens shown in FIGS. 4H-I are configured to accept user input times for turning on or off lighting effects. Other embodiments include screens for controlling timing of inflation and deflation of the inflatable device, and further enable cancellation of any set timing functions.

Having thus described several aspects and embodiments of this invention, it is to be appreciated that various alterations, modifications and improvements will readily occur to those skilled in the art. Such alterations, modifications, and improvements are intended to be part of this disclosure, and are intended to be within the spirit and scope of the invention. Accordingly, the foregoing description is by way of example only.

Use of ordinal terms such as "first," "second," "third," "a," "b," "c," etc., in the claims to modify or otherwise identify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A constant air inflatable device comprising:
   an inflatable body constructed to received constant air input;
   at least one processor and communication circuit;
   at least one fan connected to the at least one processor configured to deliver constant air input to maintain the inflatable body in an inflated state;
   at least one lighting component internal to the inflatable body connected to the at least one processor;
   at least one speaker connected to the at least one processor;
   wherein the at least one processor is configured to:
      control operation of the at least one fan to manage inflation of the inflatable body under constant air flow;
      control operation of the at least one lighting component; and
      control operation of the at least one speaker,
   wherein the at least one processor is further configured to:
      execute operational control responsive to signals from an application installed on a mobile device;
      receive at least one digital music file a from the mobile device; and
      generate a frequency for controlling the at least one lighting component responsive to receipt of the at least one digital music file from the mobile device; and
      synchronize the operation of the at least one lighting component to the frequency responsive to playing the at least one digital music file: and
   a first mobile application, the first mobile application having:
      a first user interface display configured to display a virtual light switch for controlling the at least one lighting component;
      a second user interface display configured to:
         accept user selection of at least one digital audio file; and
         trigger communication of the at least one digital music file audio file to the at least one processor;
      a third user interface display configured to accept user input of timing information and communicate control signals for operating the at least one lighting component according to the user defined timing information; and
      a menu display, accessible when displaying each of the first, second and third interfaces, configured to enable navigation between at least any of the first user interface, the second user interface, and the third user interface responsive to selection.

2. The inflatable device of claim 1, wherein the at least one processor is embedded on a motherboard.

3. The inflatable device of claim 1, wherein the at least one processor is configured to receive audio captured by a microphone on the mobile device and play the captured audio over the at least one speaker.

4. The inflatable device of claim 3, wherein the at least one processor is configured to activate light patterns of the at least one lighting component that are matched to the audio played over the at least one speaker.

5. The inflatable device of claim 1, wherein the at least one speaker is configured to play music transmitted from the mobile device.

6. The inflatable device of claim 5, wherein the at least one lighting component is configured to synchronize a frequency associated with the at least one lighting component to the music.

7. The inflatable device of claim 1, wherein the communication circuit comprises at least one of a Bluetooth communication component, a wireless network interface circuit, or a cellular communication circuit.

8. The inflatable device of claim 1, further comprising a first fan configured to control inflation of the inflatable device and a second fan configured to cause at least a portion of the inflatable device to move.

9. The inflatable device of claim 8, wherein at least one of the first fan and the second fan are configured to deliver constant and variable air flow to the inflatable body responsive to control signals from the at least one processor; and wherein the inflatable body is constructed and arranged to trigger motion of at least a first appendage of the inflatable body responsive to the variable air.

10. A method comprising:
controlling a constant air inflatable device comprising an inflatable body, based at least in part on signals from an application installed on a mobile device, by at least one processor, comprising:
  managing inflation of the inflatable body by at least one fan connected to the at least one processor;
  delivering constant air flow via the at least one fan to maintain the inflatable body in an inflated state;
  controlling operation of at least one lighting component internal to the inflatable body connected to the at least one processor; and
  controlling operation of at least one speaker connected to the at least one processor;
  receiving at least one digital music file a from the mobile device; and
  generating a frequency for controlling the at least one lighting component responsive to receipt of the at least one digital music file from the mobile device;
  synchronizing the frequency associated with the at least one lighting component to at least one music file responsive to play of the at least one digital music file from the mobile device; and
  executing a first mobile application, the first mobile application having:
    a first user interface display configured to display a virtual light switch for controlling the at least one lighting component;
    a second user interface display configured to:
      accept user selection of at least one digital audio file; and
      trigger communication of the at least one digital music file audio file to the at least one processor;
    a third user interface display configured to accept user input of timing information and communicate control signals for operating the at least one lighting component according to the user defined timing information; and
    displaying a menu display, accessible when displaying each of the first, second and third interfaces, enabling navigation between at least any of the first user interface, the second user interface, and the third user interface responsive to selection.

11. The method of claim 10, wherein the at least one processor is embedded on a motherboard.

12. The method of claim 10, wherein the at least one processor comprises an integrated circuit.

13. The method of claim 10, wherein controlling the operation of the at least one speaker comprises:
  playing audio captured by a microphone on the mobile device over the at least one speaker.

14. The method of claim 13, wherein controlling the operation of the at least one lighting component comprises:
  activating light patterns of the at least one lighting component that are matched to the audio played over the at least one speaker.

15. The method of claim 10, wherein operation of the at least one speaker comprises:
  playing music transmitted from the mobile device.

16. The method of claim 15, wherein operation of the at least one lighting component comprises:
  synchronizing a frequency associated with the at least one lighting component to the music.

17. The method of claim 10, wherein the inflatable device further comprises a communication circuit comprising at least one of a Bluetooth communication component, a wireless network interface circuit, or a cellular communication circuit.

18. The method of claim 10, wherein managing the inflation of the inflatable body by at least one fan comprises:
  controlling inflation of the inflatable device by a first fan, and
  causing at least a first appendage of the inflatable device to move by a second fan responsive to delivering variable air flow by at least the second fan.

19. The method of claim 10, wherein controlling an inflatable device based at least in part on signals from a mobile device further comprises:
  scheduling the controlling from the application installed on the mobile device.

* * * * *